United States Patent Office 3,830,770
Patented Aug. 20, 1974

3,830,770
STORAGE STABLE FILLER-CONTAINING AQUEOUS DISPERSION OF TETRAFLUOROETHYLENE POLYMER
Robert Clark Ribbans III, Wilmington, Del., assignor to E. I. du Pont de Nemours and Company, Wilmington, Del.
No Drawing. Filed June 2, 1972, Ser. No. 259,046
Int. Cl. C08f 29/16, 45/24
U.S. Cl. 260—29.6 F                         10 Claims

ABSTRACT OF THE DISCLOSURE

Filler-containing aqueous dispersions of tetrafluoroethylene polymer having good shelf life are provided, said dispersions containing from 5 to 8% by wt. (polymer solids basis) of nonionic surfactant and sufficient water soluble electrolyte, e.g. $BaNO_3$, NaCl, $Na_2CO_3$, and ammonium acetate, to give the dispersion an ionic strength of at least 0.01 moles per kilogram of dispersion, the dispersion having a viscosity of at least 50 centipoises.

---

This invention relates to storage stable filler-containing aqueous dispersions of tetrafluoroethylene polymer.

U.S. Pat. 2,717,220 to Fay discloses the preparation of a filler-containing aqueous dispersion of polytetrafluoroethylene in which a nonionic surfactant is present in order to maintain the filler (cryolite) and PTFE particles dispersed. Filler which has a much larger particle size than the dispersed polytetrafluoroethylene particles tends to settle rapidly in the dispersion, thereby giving it a poor shelf life. When sufficient nonionic surfactant is added to the dispersion to increase the shelf life of the filler-containing PTFE dispersion, the surfactant loading is so high as to cause discoloration in the sintered product obtained from the dispersion.

The present invention provides filler-containing aqueous dispersions of tetrafluoroethylene polymer which have improved storage stability and thereby good shelf life obtained through the use of only a moderate amount of nonionic surfactant, by virtue of the dispersion having an ionic strength of at least 0.01 mols per kilogram of dispersion and viscosity of at least 50 centipoises.

Ionic strength is a measure of the intensity of the electrical field in the dispersion and is defined as half the sum of the terms obtained by multiplying the concentration of each ion in solution in the dispersion by the square of the valence of the ion. The ionic strength of the dispersion and the ions which define the ionic strength are supplied by sufficient dissolved electrolyte in the aqueous phase of the dispersion to give the ionic strength desired of at least 0.01 mols per liter of dispersion, and preferably at least 0.02 moles per liter of dispersion (dispersion basis is PTFE, water, and nonionic surfactant).

Examples of electrolyte are any of the water-soluble organic and inorganic acids, bases, and salts. Of the organic compounds, those acids and salts, of the formula RCOOY wherein R is a saturated or unsaturated hydrocarbon radical and Y is H, $NH_4$ or metal, are exemplary. Of the inorganic compounds, examples are HCl, $H_2SO_4$ and bases and salts of metals or ammonium, examples of the anionic moiety of the salt being nitrate, sulphate, sulphite, carbonate, and halide. Examples of the metal moiety in the above-mentioned organic carboxylates and inorganic bases and salts are lithium, sodium, potassium, copper, barium, manganese, magnesium, calcium, zinc, aluminum, and lead. Preferably, the electrolyte does not discolor sintered or fused products obtained from the dispersion to the extent caused by nonionic surfactant in concentrations imparting equivalent storage stability to the filler-containing dispersion, and more preferably, the electrolyte yields a white or colorless residue when heated at temperatures of 340° C. for 5 minutes.

The electrolyte can be added to the dispersion either as an aqueous solution or as dry solid which dissolves in the dispersion. The storage stability of the filler-containing aqueous dispersion of tetrafluoroethylene polymer increases with increasing amount of electrolyte added to the dispersion in concentrations greater than 0.01 moles per kilogram of dispersion. Generally, an ionic strength of no more than 0.3 moles per kg. of dispersion is required for reasonably long shelf life.

The nonionic surfactant component of the dispersion is critical in the sense that at least 5% by weight of this surfactant must be present in the dispersion in order for the added electrolyte to provide the beneficial effect of improved storage stability without causing coagulation of the dispersion. If the nonionic surfactant content is increased to 11% by weight, the sintered or fused product obtained from the dispersion will have a distinct brownish color. Thus, in order to minimize discoloration caused by the nonionic surfactant, a concentration as close to 5% by wt. as possible is desired; as the polymer solids concentration in the dispersion is decreased from 60% by weight, greater amounts of the nonionic surfactant are required. Generally from 5 to 8% by weight of the surfactant will prevent coagulation when the electrolyte is added. All nonionic surfactant contents disclosed herein are based on the weight of the tetrafluoroethylene polymer solids (dispersed particles) in the dispersion.

The nonionic surfactant component is any nonionic surfactant which is soluble in water at room temperature (20–25° C.) at the concentration desired and can be composed of a single nonionic surfactant or a mixture of nonionic surfactants. Typically, the nonionic surfactants are prepared as reaction products of ethylene oxide, which imparts a hydrophilic moiety to the surfactant with other compounds which impart hydrophobic moieties to the surfactant, such as propylene oxide, amines, saturated and unsaturated aliphatic alcohols and aliphatic acids, and alkyl phenols. For purposes of illustration, some of the foregoing mentioned nonionic surfactants are further illustrated hereinafter by the formulae:

$$R'[O(A)_nH]_x$$

wherein $(A)_n$ is the group $(C_2H_4O)_n$ or a mixture of the groups $(C_2H_4O)_a$ and $(C_3H_6O)_b$, wherein $n$ in each instance is an integer of from 2 to 50 and preferably 2 to 18, $b$ is an integer of 0 to 30, and $a$ is an integer of at least 2, $a+b$ being equal to $n$; $x$ is an integer of 1, 2, or 3; and R' is an aliphatic hydrocarbon group which can be saturated or unsaturated, straight-chain, branched, or cyclic, and will generally contain from 8 to 24 carbon atoms, preferably from 8 to 18 carbon atoms; examples of R groups include oleyl, stearyl, tridecyl, lauryl, decyl and the groups derived from aliphatic glycols and triols; $R^2$—$C_6H_4O(B)_mH$, wherein B is the group $(C_2H_4O)_c$ or a mixture of the groups $(C_2H_4O)_c$ and $(C_3H_6O)_d$, wherein $m$ in each instance is an integer of from 2 to 50 and preferably 8 to 20, $d$ is an integer of 0 to 30, $c$ is an integer of at least 2, $c+d$ being equal to $m$; $R^2$ is a monovalent aliphatic and usually saturated hydrocarbon group containing 4 to 20 carbon atoms and preferably 8 to 12 carbon atoms;

and

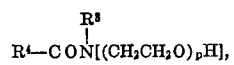

wherein $p$ is an integer of 2 to 50, $z$ is an integer of 1 or 2, $R^4$ is an alkyl group containing 1 to 8 carbon atoms, $R^3$ is a chemical bond to a group $(CH_2CH_2O)_pH$, when $z$ is 2 and an alkyl group of 1 to 8 carbon atoms when $z$ is 1, with the provisio that at least 5 carbon atoms are provided by $R^3+R^4$; the polyalkylene oxide block copolymers of the formula $$HO(C_2H_4O)_e(C_3H_6O)_f(C_2H_4O)_gH,$$

wherein $f$ is an integer of from 15 to 65 and $e$ and $f$ are integers sufficiently large that $e+g$ total 20 to 90 percent of the total weight of the polymer. For each of the surfactants of the foregoing described formulae, the hydrophobic and hydrophilic moieties are proportioned such and the total molecular weight is such that the surfactant is water soluble. Specific surfactants within these formulae include $CH_3(CH_2)_4CH_2(OCH_2CH_2)_3OH$; $CH_3(CH_2)_6CH_2(OCH_2CH_2)_8OH$;

$CH_3(CH_2)_{10}CH_2(OCH_2CH_2)_{12}(OCH(CH_3)CH_2)_5OH$;

$CH_3(CH_2)_8CH_2(OCH_2CH_2)_{10}OH$; $CH_3(CH_2)_8CH_2(OCH_2CH_2)_5OH$;

and 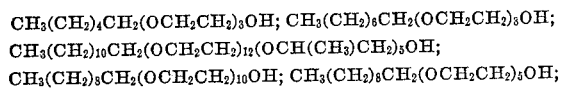

("Triton" X-100).

The tetrafluoroethylene polymer in the dispersions includes polytetrafluoroethylene and copolymers thereof with up to 35% by weight of a different perfluorinated ethylenically unsaturated monomer. Examples of such monomers include hexafluoropropylene, higher perfluoroalkenes such as those containing from 4 to 10 carbon atoms, perfluoro (alkyl vinyl ethers), e.g., perfluoro-(methyl, ethyl, or vinyl ethers), and perfluoro(2-methylene-4-methyl - 1,3 - dioxolane). Small amounts of these monomers, e.g., less than 1% by weight, copolymerized with tetrafluoroethylene, give a copolymer which has been referred to in the art as modified polytetrafluoroethylene because the high melt viscosity and non-melt fabricability of the homopolymer is retained, the melt viscosity being greater than $1 \times 10^9$ poises at 380° C. and a shear stress of 0.457 kg./cm.$^2$. Under appropriate polymerization conditions and monomer contents greater than 1% by weight in the copolymer, melt fabricable tetrafluoroethylene copolymer is obtained having melt viscosities from $1 \times 10^3$ to $1 \times 10^6$ poises at 380° C. and a shear stress of 0.457 kg./cm.$^2$.

The polytetrafluoroethylene, including modified polytetrafluoroethylene, in the dispersions of the present invention is the aqueous dispersion (called fine powder in the coagulated and dried form) type of polytetrafluoroethylene as distinguished from the granular type polytetrafluoroethylene. The aqueous dispersion type is obtained by polymerization in an aqueous medium containing dispersing agent, such as from 0.2 to 0.8% by weight (water basis) of ammonium polyfluorocarboxylate containing from 7 to 10 carbon atoms, to form an emulsion of polytetrafluoroethylene particles in water. These particles have a size (diameter) generally within the range of 0.1 to 0.5 micron as do the particles of all the tetrafluoroethylene polymers described herein. The preferred tetrafluoroethylene polymer concentration in the dispersion is 55 to 65% based on the weight of the dispersion (tetrafluoroethylene plus water plus non-ionic surfactant). The pH of the dispersion can be adjusted to be at least 7 to minimize corrosive attack on metal surfaces by the addition of a basic compound to the dispersion.

The filler used in the compositions of the present invention is a particulate solid that is insoluble in the aqueous dispersion of polytetrafluoroethylene. Preferably, the filler is white or colorless so as not to discolor the polymer product of the dispersion after sintering or fusing. The filler is of rather coarse particle size, i.e., at least 25 microns in average particle diameter, as opposed to colloidal size particles of 5 microns in average particle diameter and usually much less as would be characteristic of pigments and colloidal silica and alumina. Colloidal size particles are rather easy to keep in the dispersed state in aqueous medium while the larger particle sizes which characterize the filler used in the present invention tend to settle rapidly in the absence of electrolyte, e.g., within hours, within the dispersion, even in the presence of 5 to 8% nonionic surfactant, whereby the shelf life is too short. The maximum particle size tolerable for fillers used in the present invention will depend on the density of the filler and degree of storage stability desired; generally, the average particle diameter will be no greater than 100 microns to insure complete encapsulation of the filler in a reasonable number of passes of an article being coated by being passed through the dispersion of the present invention. Examples of filler that can be used in the present invention include inorganic mineral fillers such as diatomaceous earth, limestone, talc, and carbon and finely divided metal and glass. The preferred filler is glass beads which are generally round in shape and have an average particle diameter of 30 to 70 microns (wet sieve).

The preferred filler content in the aqueous dispersion of the present invention is from 20 to 40% based on the weight of tetrafluoroethylene polymer plus filler in the dispersion. Lesser concentrations of the filler generally lead to the formation of cracks in the sintered polytetrafluoroethylene obtained from the dispersion, which will generally be in the form of a coating. In cases where the filler is a compatible polymer, such as granular polytetrafluoroethylene or PTFE of different molecular weight, lower filler concentrations such as down to 10% by wt. can be used without causing excessive cracking in the sintered PTFE coating obtained from the dispersion. Greater concentrations of the filler reduce the ultimate elongation of the sintered or fused composition to an undesirable extent. An elongation of at least 50% in the sintered or fused product is desired for compositions of the present invention which are used in applications subject to folding or flexing such as the coating of architectural glass fabrics.

Preferably the filler-containing aqueous dispersions of tetrafluoroethylene polymer of the present invention have a viscosity of at least 50 centipoises and more preferably at least 70 centipoises. Viscosities described herein are measured using a Brookfield Viscometer (model LVF) operating at 60 r.p.m. at 25° C. using the appropriate spindle for the viscosity range in which the measured viscosity falls. These are goal viscosities which form a principal criterion for nonionic surfactant and dissolved electrolyte concentration (ionic strength) in the dispersion for a particular polymer and filler concentration in the dispersion. Thus, the surfactant concentration will generally be set as low as possible at 5% by wt. or above because of the discoloration problem, but in a sufficient amount to avoid coagulation when electrolyte is added, and the electrolyte addition will be in a sufficient amount to give the dispersion viscosity desired. As the polymer and filler concentrations change, especially the former, the nonionic surfactant concentration must also change (in an inverse relationship) to provide the stability necessary to withstand the electrolyte addition. Generally, the present invention is applicable to concentrations of 45 to 75% by wt. of tetrafluoroethylene based on the weight of the dispersion, with the lower amount being limited by the relatively large amount of nonionic surfactant needed for dispersion stability and the concomitant discoloration resulting therefrom.

The dispersions of the present invention are useful for coating articles, especially heavy weight glass fabrics, i.e., weighing at least 8 oz./yd.$^2$ (277 g./m.$^2$), because such fabrics will generally have apertures between the yarn of the fabric of at least 6 mils (0.15 mm.) in the smallest width dimension. The filler in the dispersions of the present invention helps fill up these apertures with coating material with fewer re-coating steps than if the filler were omitted. The resultant heavy weight glass fabric with a continuous coating of residue of dispersion of the present invention after drying and sintering (PTFE) or fusing (melt fabricable tetrafluoroethylene copolymer) is especially useful in architectural applications such as for an inflatable roof. In such application, the preferred filler is glass, especially glass beads, because of its translucency and colorless nature, the resultant coated glass fabric also being translucent to sunlight. In such application, the dispersion coating composition of the present invention is free of pigment because pigment would render the coating and thus the coated glass fabric opaque.

The following Examples are intended as being illustrative of the present invention and not as a limitation on the scope thereof (parts and percents are by weight unless otherwise indicated):

each case, the first coating applied to the fabric was pure PTFE obtained from the starting PTFE aqueous dispersion described above but diluted with water to about 50% by weight polymer solids; this undercoat prevents the relatively abrasive filler material of the subsequent coats from contacting the glass fabric. After coating with the filler-containing PTFE aqueous dispersion of this invention, the resultant coated glass fabric was then immersed in an aqueous dispersion of tetrafluoroethylene/hexafluoropropylene copolymer (15–20% by weight hexafluoropropylene) to top coat the PTFE-filler coating with compatible fusible polymer to insure the healing of any microscopic cracks in the PTFE-filler coatings. Further details of these experiments and results are given in Table I.

TABLE I

| | | Filler, PTFE aqueous dispersion | | | | | |
|---|---|---|---|---|---|---|---|
| Fabric type | Salt | Salt conc., wt. percent dispersion basis | Ionic strength, moles/ 1,000 g. dispersion | Filler conc., wt. percent PTFE plus filler basis | Number of passes[1] | Wt. of coated fabric, oz./yd.[2] | Appearance |
| Example number: | | | | | | | |
| 1 | A | Pb(NO₃)₂ | 2 | 0.18 | 30 | 6 | 41.1 | Yellow smooth coating without bubbles or cracks. |
| 2 | A | Ba(NO₃)₂ | 2 | 0.23 | 30 | 5 | 37.5 | Same as Ex. 1 except white. |
| 3 | C | Ba(NO₃)₂ | 1 | 0.11 | 30 | 5 | 42.0 | Same as Ex. 2. |
| 4 | C | Ba(NO₃)₂ | 0.5 | 0.06 | 30 | 5 | 43.1 | Do. |
| 5 | B | Ba(NO₃)₂ | 0.2 | 0.02 | 30 | 5 | 48.0 | Do. |
| 6(control) | D[3] | None[4] | | | 30 | 3 | 21.8 | Color tan to brown. |
| 7 | D | Ba(NO₃)₂ | 0.2 | 0.02 | 30 | 3 | 22.8 | Same as Ex. 2. |
| 8 | D | NH₄NO₃ | 0.2 | 0.03 | 35.7 | 3 | 22.3 | Same as Ex. 2 except off-wh t |
| 9 | D | Na₂CO₃ | 0.2 | 0.06 | 35.7 | 3 | 23.7 | Same as Ex. 2 except light g a y |

[1] Includes PTFE undercoat and TFE/HFP copolymer topcoat.
[2] Final weight including all coat.
[3] Not resized after heat cleaning.
[4] Salt omitted from dispersion and 4.5 wt. percent (polymer basis) additional "Triton" X-100 nonionic surfactant added to PTFE aqueous dispersion.

EXAMPLES 1 to 9

The PTFE aqueous dispersion used in these experiments contained 60% by wt. PTFE solids (dispersed particles) dispersion basis (PTFE, surfactant, water), 6.5% by wt. "Triton" X–100 nonionic surfactant and had an average particle diameter of 0.20 microns. A weighed quantity of glass beads (av. part. dia. of 30–44 micron) as the filler was added as a dry particulate solid to this dispersion and stirred at an energy input of about 10 h.p./3785 liters to disperse the filler while avoiding coagulation. During this stirring a weighed quantity of dry electrolyte (salt in these experiments) was added to the dispersion and stirring was continued for about 15 minutes. The resultant dispersion unless otherwise indicated was used to coat various glass fabrics of the following types:

| Fabric type | Yarn type | Fabric weight oz./yd.[2] | Fabric weight g./m.[2] | Weave | Thickness mm |
|---|---|---|---|---|---|
| A | Beta 150 2/2 | 12 | 416 | 35 x 35 | 0.41 |
| B | Beta 150 4/3 | 18 | 623 | 18 x 18 | 0.66 |
| C | Beta 150 4/2 | 12 | 416 | 20 x 17 | 0.55 |
| D | 225 3/2 | 8.8 | 304 | 32 x 21 | 0.30 |

Prior to coating, each fabric was heat cleaned at an oven temperature of about 540° C. and then dipped into an aqueous silicone emulsion (Dow Corning ET–4327), 1–5% by wt. silicone, to resize the fabric with high temperature resistant material. The fabric was then dried at an oven temperature of 200–260° C. The fabric was coated by immersion in the dispersion for about 30 seconds, followed by wiping excess dispersion from the fabric surface and continuous passage through a vertical oven having a drying zone at 150 to 260° C. and a sintering zone operating at a temperature of about 370° C. at the exit end of the oven. This coating operation was repeated to get the loading desired on the fabric. In The discoloration caused by 11% by wt. concentration of nonionic surfactant is shown in Example 6. The yellow, off-white and gray colorations obtained for the sintered coatings of Examples 1, 8, and 9 were much less intense and, therefore, less objectionable than the color of the Example 6 coating. All the coatings were translucent. All the filler-containing dispersion compositions exhibited shelf life, of greater than one week (no perceptible settling of the glass beads to the bottom of the storage vessel). In contrast when the electrolyte was omitted from the filler-containing dispersion (6.5% nonionic surfactant), the filler settled to the bottom of the storage vessel within several hours.

EXAMPLES 10–33

To a dispersion of known polymer and nonionic surfactant content were added nonionic surfactant and water to give the polymer, and nonionic surfactant concentrations recorded in Table II while stirring moderately with a Brookfield counter-rotating agitator at room temperature. Electrolyte was then added to the dispersion during this stirring, followed by the addition of glass beads and further stirring for about 5 minutes to give 35% glass by weight, based on polymer in the dispersion. The beads were type (A) Potter Bros. #3000, passing a 325 mesh screen (44 microns), or (B) Preiser glass beads, passing a 380 mesh screen, each type having an average particle diameter greater than 30 microns.

The pH of the dispersion prior to electrolyte addition was basic (pH of 9) by NH₄OH addition. After electrolyte addition the pH of the dispersion was estimated using "Hydrion" pH paper. Further details of these experiments and results are given in Table II.

TABLE II

| Example: | Glass bead type | Wt. percent PTFE, dispersion basis | Nonionic surfactant, wt. percent PTFE basis [1] | Electrolyte | Wt. percent PTFE basis | Ionic strength, moles/kg. of dispersion | Viscosity, cps. | Storage stability, days [2] |
|---|---|---|---|---|---|---|---|---|
| 10 (control) | B | 59.8 | 6.5 | None | | ca. 0.0004 | 21.4 | Poor |
| 11 | B | 60.0 | 5.0 | KNO₃ | 0.4 | 0.024 | 30.1 | Poor |
| 12 | B | 60.0 | 7.0 | KNO₃ | 0.4 | 0.024 | 225 | 20+ |
| 13 | B | 60.1 | 6.1 | KNO₃ | 0.17 | 0.01 | 32.2 | Poor |
| 14 | B | 60.1 | 6.1 | KNO₃ | 0.5 | 0.03 | 133 | 12+ |
| 15 | B | 60.0 | 6.0 | KNO₃ | 0.4 | 0.024 | 58.3 | ---- |
| 16 | A | 50.0 | 6.0 | KNO₃ | 0.4 | 0.02 | 9.7 | Poor |
| 17 | B | 60.1 | 6.1 | Ba(NO₃)₂ | 0.13 | 0.009 | 19.5 | Poor |
| 18 | B | 60.1 | 6.1 | Ba(NO₃)₂ | 1.3 | 0.09 | 282 | 12+ |
| 19 | B | 60.1 | 6.1 | K₂SO₄ | 0.087 | 0.009 | 25.5 | Poor |
| 20 | B | 60.1 | 6.1 | K₂SO₄ | 0.29 | 0.03 | 233 | 12+ |
| 21 | A | 60.1 | 6.1 | Na₂CO₃ | 0.053 | 0.009 | 19.9 | Poor |
| 22 | A | 60.1 | 6.1 | Na₂CO₃ | 0.18 | 0.03 | 86.5 | 12+ |
| 23 | A | 60.1 | 6.1 | NaCl | 0.097 | 0.01 | 18.5 | Poor |
| 24 | A | 60.1 | 6.1 | NaCl | 0.29 | 0.03 | 126 | 11+ |
| 25 | A | 60.1 | 6.1 | Ba(OH)₂ | 0.086 | 0.009 | 23 | Poor |
| 26 | A | 60.1 | 6.1 | Ba(OH)₂ | 0.29 | 0.03 | 142 | 11+ |
| 27 | A | 60.1 | 6.1 | NH₄ acetate | 1.4 | 0.1 | 233 | 7+ |
| 28 | A | 60.1 | 6.1 | Oxalic acid [3] | 2.3 | ---- | 222 | 7+ |
| 29 | A | 60.1 | 6.1 | HCl | 0.56 | 0.1 | 940 | 6+ |
| 30 | A | 60.1 | 6.1 | NaOH | 0.67 | 0.1 | 264 | 4+ |
| 31 | A | 58.0 | 7.0 | Ba(NO₃)₂ | 1.3 | 0.09 | 664 | 4+ |
| 32 | A | 58.0 | 5.0 | Ba(NO₃)₂ | 1.3 | 0.09 | 165 | 3+ |
| 33 | A | 60.0 | 8.0 | KNO₃ | 0.17 | 0.01 | 205 | 4+ / 8+ |

[1] The nonionic surfactant for Exs. 10 to 30 and 33 was "Triton" X-100, for Ex. 31 was ethoxylated aliphatic alcohol believed to have the formula CH₃(CH₂)₈CH₂(OCH₂CH₂)₅OH, for Ex. 32 was a mixture of 2.8% of the surfactant of Ex. 31 and 2.2% "Triton" X-100.

[2] The rating of poor means glass beads settled in less than one day; the indication + after days means the stability was for a longer period of time than the number of days given, time not permitting determination of the stability end point for such dispersions.

[3] Electrolyte formed in situ, thought to be ammonium salt of oxalic acid.

Storage stability of the dispersions in Table II was observed by storing the dispersion in a glass vessel at room temperature and inspecting for accumulation of glass beads at the bottom of the vessel. Examples 11, 13, 16, 17, 19, 21, 23, and 25 are included in Table II for comparison purposes to show either insufficient non-ionic surfactant or ionic strength for a minimum storage stability of at least one day. The viscosities of the dispersions of these comparison Examples are all less than 35 centipoises. On the other hand, the viscosities of the dispersions having storage stability of at least 3 days (Examples 12, 14, 15, 18, 20, 22, 24 and 26 to 33) all were at least 86.5 centipoises (the viscosity of the dispersion of Example 15 was not measured). These high viscosity dispersions were pseudo-plastic, i.e., showing increasing viscosity with decreasing shear rate. Extrapolation of results between these levels of storage stability suggests that a minimum of 50 centipoises in viscosity is desired for storage stability greater than 1 and preferably greater than 2 days. The dispersions of the comparison Examples can be made more storage stable by increasing surfactant content (compare Ex. 11 and 12) or electrolyte content (compare Ex. 17, 18, and 32).

The pH's of some of the dispersions after electrolyte addition were as follows: pH of 9 for Ex. 11 and 12; pH of 8 for Ex. 27; pH of 10 for Ex. 30; and pH of 1 for Exs. 28 and 29.

EXAMPLE 34

The procedure of Examples 10–33 was followed to make a filler-containing aqueous dispersion of tetrafluoroethylene/hexafluoropropylene copolymer (15–20% by wt. HFP) in which the copolymer concentration was 55% by wt. (dispersion basis), the "Triton" X-100 concentration was 10% by wt. (copolymer basis), the filler was type A glass beads at a concentration of 35% by wt. (copolymer basis), the electrolyte was Ba(NO₃)₂ at a concentration of 1.4% by wt. (copolymer basis) to give an ionic strength of 0.09 moles/kg. of dispersion (copolymer, surfactant, and water). The viscosity of the dispersion was 416 cps. and the dispersion exhibited a storage stability of four days and was still going. The high viscosity of this dispersion suggests that the nonionic surfactant concentration can be reduced somewhat and reasonable storage stability still be retained.

As many apparently widely different embodiments of this invention may be made without departing from the spirit and scope thereof, it is to be understood that this invention is not limited to the specific embodiments thereof except as defined in the appended claims.

What is claimed is:

1. An aqueous dispersion consisting essentially of 45 to 75% by weight of poly tetrafluoroethylene or copolymers of tetrafluoroethylene with up to 35% by weight of a different perfluorinated ethylenically unsaturated monomer and 10 to 40% by weight filler, polymer plus filler basis, said polytetrafluoroethylene or copolymers of tetrafluoroethylene having a melt viscosity of a minimum of $1 \times 10^6$ poises at 380° C., said filler having an average particle size of at least 25 microns, said dispersion containing particles of tetrafluoroethylene polymers of 0.1 to 0.5 microns in diameter and having dissolved in said dispersion at least 5.0% by weight of nonionic surfactant, polymer basis, and sufficient inorganic electrolyte to give said dispersion an ionic strength of at least 0.01 moles per kilogram of dispersion, said dispersion having a viscosity of at least 50 centipoises.

2. The dispersion of Claim 1 wherein the polymer concentration is 55 to 65% by wt.

3. The dispersion of Claim 1 wherein the polymer is polytetrafluoroethylene.

4. The dispersion of Claim 1 wherein the surfactant concentration is from 5.0 to 8.0% by wt.

5. The dispersion of Claim 1 wherein said electrolyte is an inorganic barium salt.

6. The dispersion of Claim 1 wherein said electrolyte is an inorganic potassium salt.

7. The dispersion of Claim 1 wherein said filler is glass and its concentration is 20 to 40% by wt.

8. The dispersion of Claim 7 wherein said glass is in the form of beads.

9. The dispersion of Claim 1 wherein the nonionic surfactant is an ethoxylated aliphatic alcohol or ethoxylated alkyl phenol.

10. The dispersion of Claim 1 wherein said electrolyte is a nitrate.

References Cited

UNITED STATES PATENTS

| | | | |
|---|---|---|---|
| 2,891,921 | 6/1959 | Kumnick et al. | 260—29.6 |
| 3,705,867 | 12/1972 | Holmes | 260—29.6 |
| 3,709,721 | 1/1973 | King | 260—29.6 F |
| 3,700,627 | 10/1972 | Miller | 260—29.6 F |
| 3,301,807 | 1/1967 | Hoashi | 260—29.6 F |

FOREIGN PATENTS 7,100,111   7/1971   Netherlands.

MELVIN GOLDSTEIN, Primary Examiner

W. C. DANISON, JR., Assistant Examiner

U.S. Cl. X.R.

117—126 GB, 161 UF